(12) United States Patent
Kodama (10) Patent No.: US 7,903,088 B2
(45) Date of Patent: Mar. 8, 2011

(54) COMPUTER KEYBOARD WITH POINTER CONTROL

(76) Inventor: Robert R. Kodama, Seattle, WA (US)

(*) Notice: Subject to any disclaimer, the term of this patent is extended or adjusted under 35 U.S.C. 154(b) by 1319 days.

(21) Appl. No.: 11/254,452

(22) Filed: Oct. 20, 2005

(65) Prior Publication Data

US 2006/0082548 A1 Apr. 20, 2006

Related U.S. Application Data

(60) Provisional application No. 60/621,006, filed on Oct. 20, 2004.

(51) Int. Cl.
*G06F 3/02* (2006.01)
(52) U.S. Cl. ............ 345/168; 345/156; 345/167; 341/21
(58) Field of Classification Search .................. 345/161, 345/163–168, 156–158; 341/21–23
See application file for complete search history.

(56) References Cited

U.S. PATENT DOCUMENTS

| | | | |
|---|---|---|---|
| 5,119,078 A | 6/1992 | Grant | 340/711 |
| 5,269,004 A | 12/1993 | Comerford et al. | 395/275 |
| 5,410,333 A * | 4/1995 | Conway | 361/680 |
| 5,416,730 A * | 5/1995 | Lookofsky | 361/680 |
| 5,561,445 A * | 10/1996 | Miwa et al. | 345/163 |
| 5,585,823 A * | 12/1996 | Duchon et al. | 345/163 |
| 5,675,361 A | 10/1997 | Santilli | 345/168 |
| 5,694,123 A | 12/1997 | Selker et al. | 341/22 |
| 5,867,808 A | 2/1999 | Selker et al. | 702/41 |
| 5,936,555 A | 8/1999 | Zagnoev | 341/22 |
| 6,046,728 A | 4/2000 | Hume et al. | 345/157 |
| 6,057,540 A | 5/2000 | Gordon et al. | 250/221 |
| 6,088,022 A | 7/2000 | Rakoski | 345/168 |
| 6,100,875 A | 8/2000 | Goodman et al. | 345/163 |
| 6,243,258 B1 * | 6/2001 | Paratore | 361/680 |
| 6,271,834 B1 | 8/2001 | May et al. | 345/168 |
| 6,424,338 B1 | 7/2002 | Anderson | 345/173 |
| 6,545,664 B1 | 4/2003 | Kim | 345/158 |
| 6,614,421 B1 | 9/2003 | Selker et al. | 345/168 |
| 6,697,054 B1 | 2/2004 | Kamizono | 345/168 |
| 6,712,533 B2 | 3/2004 | Chen | 400/472 |
| 6,727,829 B2 | 4/2004 | Jam | 341/20 |

(Continued)

OTHER PUBLICATIONS

IP.com Prior Art Database, "Mouseboard", http://www.priorartdatabase.com/IPCOM/000033204/, download date Jan. 19, 2007.

(Continued)

*Primary Examiner* — Kimnhung Nguyen
(74) *Attorney, Agent, or Firm* — Seed IP Law Group PLLC (57) ABSTRACT

A computer pointer control device includes a support base and a keyboard. The device includes a structure configured to reduce friction between the support base and an underlying surface. A wrist support is positioned on the support base, configured to receive a user's wrist thereon such that keys of the keyboard are under the fingers of the user's hand, while the user is able to slide the device over the underlying surface by applying lateral pressure to the wrist support. A position tracking mechanism coupled to the device is configured to detect horizontal movement of the base over the underlying surface and transmit a signal to an associated computer to control an on-screen pointer. The device may be configured to receive both of a user's wrists or may be one of a pair of similar pointer control devices configured to be independently controlled by the user.

11 Claims, 7 Drawing Sheets

U.S. PATENT DOCUMENTS

| | | |
|---|---|---|
| 6,753,850 B2 | 6/2004 | Poole .................... 345/161 |
| 2003/0103791 A1 | 6/2003 | Chen .................... 400/472 |
| 2003/0206154 A1 | 11/2003 | Hill et al. .................... 345/168 |
| 2004/0008186 A1* | 1/2004 | McAlindon .................... 345/168 |
| 2004/0196260 A1* | 10/2004 | Lin et al. .................... 345/161 |
| 2004/0196264 A1* | 10/2004 | Criscione .................... 345/168 |
| 2006/0055675 A1* | 3/2006 | Wilk et al. .................... 345/168 |

OTHER PUBLICATIONS

Boege, W., Designer; Yanko Design, "World's Largest Mouse", http://www.yankodesign.com/2008/10/30/worlds-largest-mouse/, downloaded Nov. 5, 2008.

* cited by examiner

COMPUTER KEYBOARD WITH POINTER CONTROL

CROSS-REFERENCE TO RELATED APPLICATION

This application claims the benefit under 35 U.S.C. §119(e) of U.S. Provisional Patent Application No. 60/621,006 filed Oct. 20, 2004, where this provisional application is incorporated herein by reference in its entirety.

BACKGROUND OF THE INVENTION

1. Field of the Invention

This invention relates generally to the field of onscreen pointer control for computers, and in particular to devices that incorporate pointer control into a keyboard.

2. Description of the Related Art

Video pointer control devices are commonly used in most personal computer systems and workstations to manipulate an onscreen pointer. Mice are the best known and most common such devices. Most mice fall into two general categories: mechanical and optical. A mechanical mouse employs a roller ball positioned in an aperture in a lower surface of the mouse. The device is configured such that, as the mouse traverses a flat underlying surface, the roller ball rotates inside the mouse. Mechanical and/or optical systems within the mouse detect rotation of the ball in two axes and translate the detected rotation into signals that are transmitted to the computer, which in turn moves a pointer on the screen in accordance with the detected rotation. Such mechanical mouse pointer control devices have been in common use for many years.

Optical mouse pointers are a more recent development. Such a device employs a light emitter and an optical sensor positioned in close proximity to each other on the lower side of the mouse. The emitter, a light emitting diode (LED), for example, illuminates the surface beneath the mouse. As the mouse is moved by a user, the optical sensor detects the movement as variations in the reflected light, in the two axes. This is again transmitted to the computer where an onscreen pointer moves in response.

Another pointer control device includes a gyroscopic sensor configured to detect movement of the device, without reference to an underlying surface, such that it may be operated in free space.

While the mouse is the most common, other types of pointer control devices have come into use for applications where a mouse is impractical. For example, a trackball is a device in which a roller ball is positioned on an upper surface of the device, such that a user manipulates the ball directly to generate a control signal for the screen pointer. Trackballs do not require as much space, since they are stationary. In some cases, the trackball housing is attached to a computer keyboard, or, in the case of some notebook style computers, integrated into a front portion thereof. In other systems, especially of the notebook style, a touch sensitive pad is integrated into the keyboard, or a small knob is positioned between keys of the keyboard. In the latter device, a user presses against the knob to generate the control signals.

Control of an on-screen pointer or cursor may also be carried out via keys of a computer keyboard. For example the arrow keys may be employed in some cases. Additionally, the combined use of the ALT or CTRL keys with other keys, sometimes referred to as chording, may also affect cursor movement, placement, page scrolling, etc.

BRIEF SUMMARY OF THE INVENTION

According to an embodiment of the invention, a computer pointer control device is provided, comprising a housing with computer keys positioned on the housing. The device includes one or more structures configured to reduce friction between the housing and an underlying surface on which the housing is resting. A wrist support is positioned on an upper surface of the housing, configured to receive a user's wrist thereon in a manner such that the keys of the keyboard are under the fingers of the user's hand, while the user is able to slide the device over the underlying surface by applying lateral pressure to the wrist support.

The device may be configured to receive both of a user's wrists and include a substantially complete alphabetical keyboard, or may be one of a pair of similar pointer control devices and be configured to receive only one of the user's wrists, such that each device includes a portion of a complete keyboard and is independently controlled by the user.

A position tracking mechanism coupled to the device is configured to detect horizontal movement of the housing over the underlying surface. The tracking mechanism may be an integral component of the housing, or it may be a separate tracking device, such as a mouse, docked to the housing. The tracking mechanism is configured to transmit a signal to an associated computer to control an on-screen pointer.

The keyboard may be integrated with the position tracking mechanism as a unitary structure, or, in accordance with an alternate embodiment, the keyboard may be removably positioned on base.

Another embodiment includes a game controller having a tracking mechanism configured such that movement of the controller over an underlying surface is detected by the tracking mechanism, the mechanism further configured to transmit data related to the detected movement to an associated game system.

A further embodiment includes an electronic device having a tracking mechanism configured to detect movement of the electronic device over an underlying surface. According to various alternate embodiments, the electronic device may be any of a variety of types of devices, including notebook computer, a personal digital assistant, a cellular telephone, a portable game player, a digital media player, and a pocket computer.

BRIEF DESCRIPTION OF THE SEVERAL VIEWS OF THE DRAWING(S)

In the drawings, identical reference numbers identify similar elements or acts.

FIGS. 4-7A each illustrates an additional embodiment of the invention.

FIGS. 8-13 each illustrates an additional embodiment of the invention.

DETAILED DESCRIPTION OF THE INVENTION

In the following description, certain specific details are set forth in order to provide a thorough understanding of various embodiments of the invention. However, one skilled in the art will understand that the invention may be practiced without these details.

While many pointer control devices are in common use at the present time, most suffer from one shortcoming in particular. In order to manipulate the device, the user must move a hand from the keyboard. A touch typist, for example, must interrupt a stream of typing in order to do this. Depending on the amount of pointer manipulation required, this can represent a significant impact on productivity.

Figure 1:
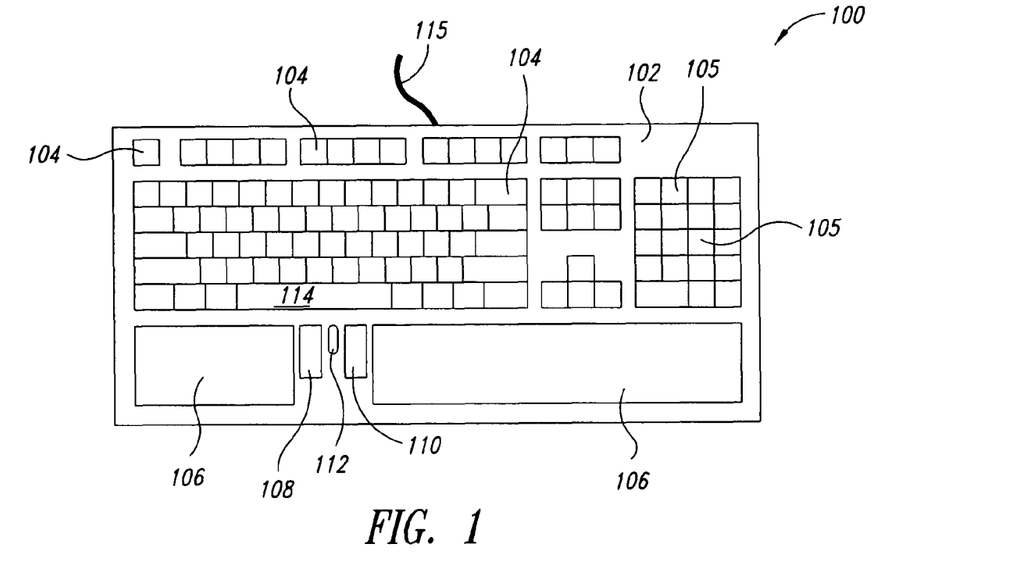
FIG. 1 shows a computer keyboard according to a first embodiment of the invention, in plan view.

FIG. 1 illustrates a computer keyboard including a pointer control device, according to a first embodiment of the invention. The keyboard 100 includes a housing 102 and a plurality of computer keys 104, arranged as may be found on most common computer keyboards. The space bar 114 is indicated separately for clarity. Numeric keys 105 are also shown in a typical arrangement. The keyboard 100 further includes wrist support pads 106 configured to receive a user's wrist for resting thereon. In addition, click buttons 108, 110 and scrolling wheel 112 are configured to operate in a manner similar to the left and right click buttons and scrolling wheel of a typical computer mouse, respectively. A control cable 115 is configured to transmit control signals to a computer.

Figure 2:
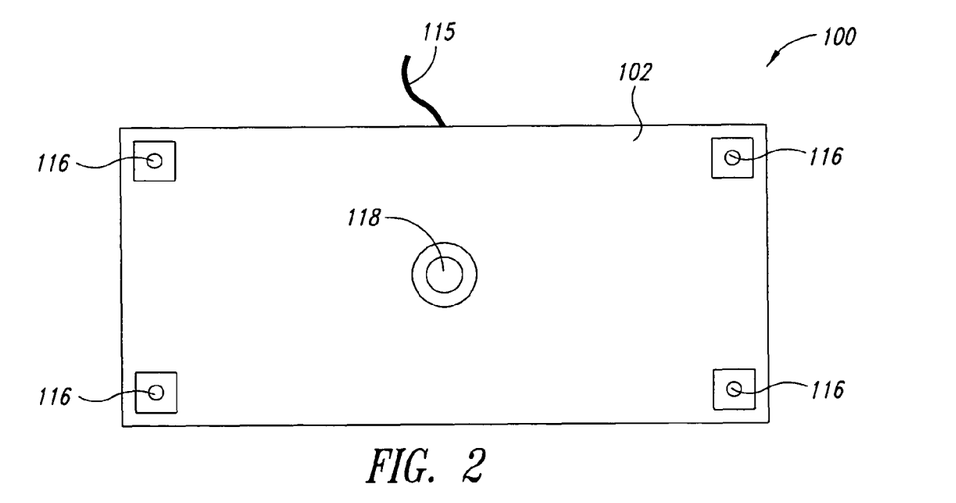
FIG. 2 shows a bottom surface of the keyboard of FIG. 1.
Figure 3:
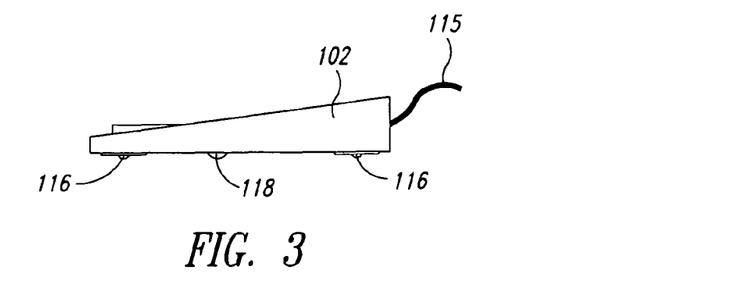
FIG. 3 shows a side view of the keyboard of FIG. 1.

FIG. 2 shows a bottom view of the computer keyboard 100, while FIG. 3 shows a side view thereof. The computer keyboard 100 includes a plurality of friction reduction mechanisms 116 configured such that, when the computer keyboard 100 is placed on a smooth surface, the keyboard 100 slides easily in any direction along the surface. The keyboard 100 also includes a position tracking mechanism 118, configured to track the movement of the keyboard 100 in two axes of movement relative to an underlying surface, in a manner similar to the tracking mechanisms of typical mouse pointer devices.

The friction reduction mechanisms 116 are shown as roller balls. However, it will be recognized that there is a wide variety of devices and mechanisms that may be employed to fulfill the function of the friction reduction mechanisms 116. For example, the bottom surface of the housing 102 of the keyboard 100 may be provided with a plurality of low-friction blocks, such as Teflon™ or other suitable material. Alternatively, a large percentage of the lower surface of the keyboard 100 may have a thin sheet or coating of a low friction material such as Teflon™. According to another embodiment, the keyboard 100 is provided with a plurality of much smaller ball bearings configured to perform the same function. These and other friction reduction mechanisms fall within the scope of the invention.

The position tracking mechanism 118 is shown comprising a roller ball, whose function is well known in the art in connection with its use in typical mouse pointer devices. Nevertheless, other systems and devices configured to detect movement and relative position are also well known in the art, and include optical tracking devices, such as have been described above. Other position tracking or motion sensing systems also include the use of hall effect sensors, gyroscopes, direct mechanical feedback systems, inductively coupled devices such as digitizing tablets and pens, etc. Any structure or device capable of providing pointer position and movement control signals to a computer is considered to fall within the scope of the invention.

In operation, an operator places one or both of his hands such that his wrists or hands are supported by the pads 106, and such that his thumbs are positioned near the spacebar 114 and click buttons 108, 110. In this position, the operator is free to type on the keyboard 100, striking the keys 104, 114 in a known manner, as required. In addition, the operator is able to independently control the position of an onscreen pointer, such as that typically associated with common mouse pointer devices, simply by moving his hands cooperatively such that the pressure of his wrists on the pads 106 causes the keyboard 100 to slide on the underlying surface upon which it is resting. The position tracking mechanism 118 detects movement of the keyboard 100 relative to the underlying surface, and translates that movement to signals that are provided to the computer for positioning of the pointer. With the operator's thumbs positioned near the click keys 108, 110, the operator can easily manipulate the keys 108, 110, and the scroll wheel 112 without repositioning his hands. In this way, the functions of a typical computer mouse and a typical computer keyboard are combined into the keyboard 100 in a manner that permits an operator to control both functions without repositioning his hands from the keyboard.

The computer keyboard 100 is shown having a control cable 115 configured to transmit operating control data to the computer in a known manner. It will be recognized that the computer keyboard 100 may also be configured to operate using wireless technology such as is well known in the art, in which case, the device will not require a control cable 115.

Figure 4:
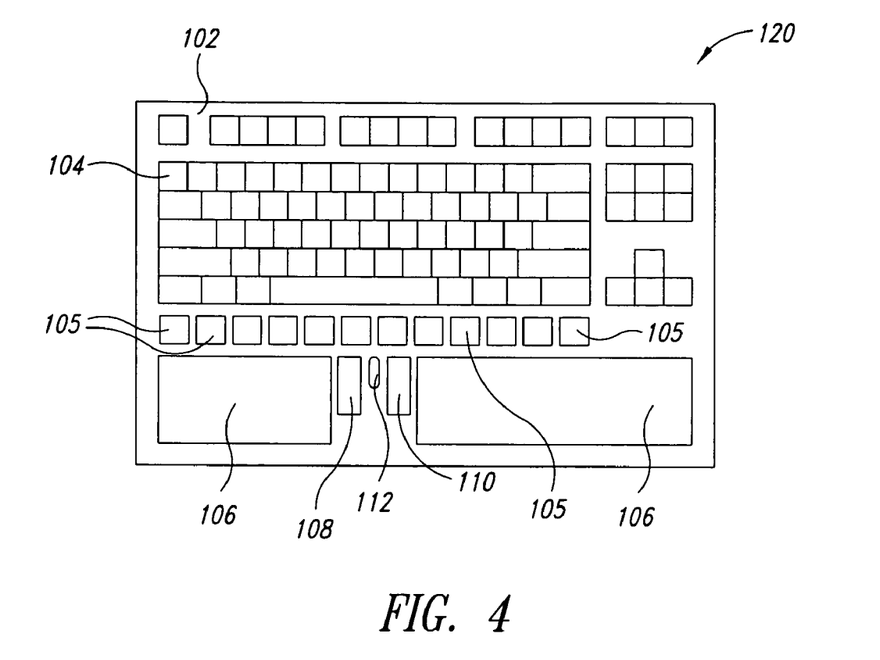
Figure 5:
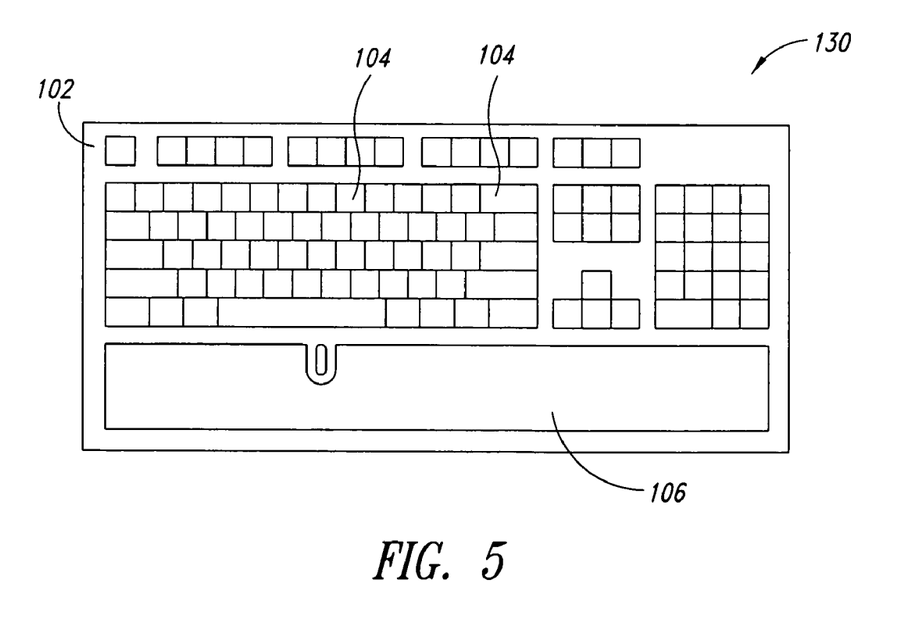
Figure 6:
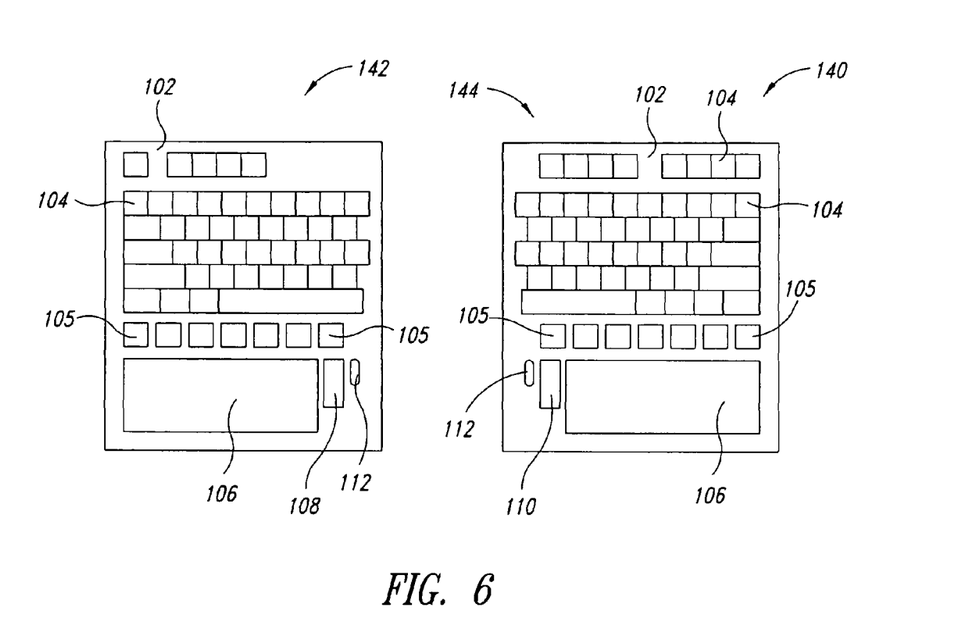

FIGS. 4-6 illustrate various computer keyboard configurations according to additional embodiments of the invention. Referring to FIG. 4, a computer keyboard 120 is shown, in which the numeric keys 105 are arranged between the wrist pads 106 and the alphabetical keys 104, including the spacebar 114. In the configuration of the keyboard 120, the dimensions of the overall keyboard are reduced, and the various keys of the keyboard are placed closer to an operator's normal rest position. This further reduces the need, on the part of the operator, to reach away from the normal finger positions on the keyboard 120. This configuration is especially beneficial in applications where the numerical keys are in frequent use.

According to the embodiment of FIG. 5, the keyboard 130 is not provided with click buttons such as buttons 108,110 of FIG. 4. Instead, the computer has software configured to recognize the functions of a typical mouse click button such that, when particular ones of the keys 104, or combinations of the keys 104, are struck by the operator, the associated computer is configured to respond as though one or another mouse click key had been pressed. Software for enabling a computer to operate as described is well known in the art. For example, U.S. Pat. No. 6,469,694, issued to Mikan, discloses one such software scheme. It is within the scope of abilities of one having ordinary skill in the art to provide other programs for this purpose. In this embodiment, a single wrist support pad 106 is positioned across the bottom of the keyboard, with a scroll wheel 112 embedded. In another embodiment, the scroll wheel is also eliminated, with its function being provided by other keys or chords of key, or eliminated entirely.

According to an embodiment not pictured, the scrolling wheel 112 is also not provided.

The keyboards 120 and 130 are each provided with friction reduction mechanisms and position tracking mechanisms similar to the devices described with reference to the embodiment of FIGS. 1-3.

With reference to FIG. 6, an embodiment is illustrated in which the keyboard 140 comprises two keyboard segments 142, 144, each having a housing 102 and a plurality of keys 104. Each keyboard segment 142, 144 is also provided with a wrist pad 106, and a single click key 108, 110, respectively. Each segment 142, 144 may be provided with a scroll wheel 112, as shown. Alternatively, a scroll wheel 112 may be provided on only one, or neither of the segments. According to another alternate embodiment, one or both of the segments 142, 144 is provided with two click keys 108, 110, such that an operator may invoke either function with either hand.

Each keyboard segment 142, 144 is provided with a plurality of friction reduction mechanisms, such as those described with reference to FIGS. 2 and 3. Each segment 142, 144 is also provided with a position tracking mechanism, such as the mechanism 118 described with reference to FIGS. 2 and 3, for tracking movement of the respective segment relative to an underlying surface.

Divided keyboards, in which all the keys of a typical computer keyboard are distributed between two keyboard segments, are well known in the art. Such a configuration permits a user to position the keyboard segments in a manner that is ergonomically appropriate for the particular user.

The embodiment of FIG. 6 provides a user with the ergonomic advantages of a separated keyboard, as well as the ability to manipulate an onscreen pointer without moving one's hands from the keyboard. By placing his left wrist on the wrist pad 106 of the segment 142, and his right wrist on the wrist pad 106 of keyboard segment 144, an operator can move an on-screen pointer with movements of either hand. Alternatively, in cooperation with the keyboard 140 of FIG. 6, a user's computer may be provided with an additional onscreen pointer, such that the operator is able to manipulate the position and operation of separate pointers with each hand. It is within the abilities of one having ordinary skill in the art to create software to support such an embodiment.

In FIGS. 1 and 4-6, various configurations of keyboards have been disclosed. The inventor has not attempted to disclose all possible keyboard configurations, but merely to demonstrate a few of the many possible configurations that may be employed. Accordingly, the scope of the invention is not limited to the configurations depicted herein, but includes any configuration of keyboard, inasmuch as such variations are a matter of convenience for a particular use or application. For example, other configurations may include one or more resting surfaces, such as finger wells, configured to receive the users fingers when not engaged in typing. Additionally, other active components or input devices may be included, such as touch pads, for example.

Figure 7A:
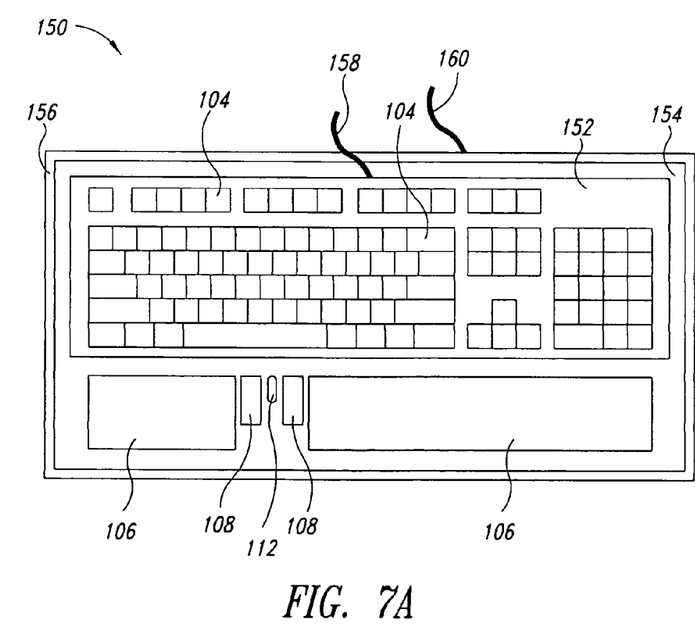
Figure 7B:
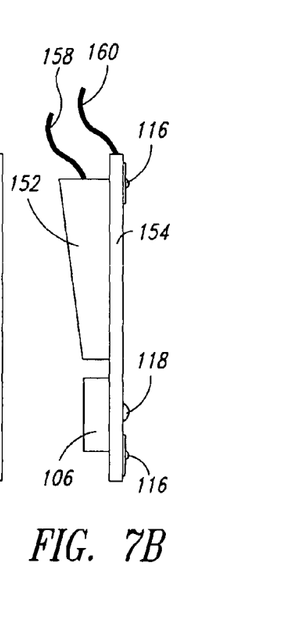
FIG. 7B shows a side view of the embodiment of FIG. 7A.

Referring now to FIGS. 7A and 7B, a pointer control device 150 is illustrated in plan and side view, respectively, according to another embodiment of the invention. The pointer control device 150 includes a support base 154 configured to receive thereon a computer keyboard 152, or a notebook computer, such as are commonly known in the art. The support base 154 includes wrist pads 106, click buttons 108, 110, and a scroll wheel 112. A low ridge 156 is provided around a perimeter of the support base 154 to prevent the keyboard 152 from sliding off the support base 154 during operation. As may be seen in the side view 7B, the pointer control device 150 further includes friction reduction mechanisms 116 and a position tracking mechanism 118 to track movement of the support base over an underlying surface. The pointer control device 150 also includes a control cable 160, separate from the control cable 158 provided with the keyboard 152. The control cable 160 is configured to be coupled with the computer port normally configured to receive a mouse control cable. The pointer control device 150 is configured to operate in a manner similar to that described with reference to the embodiment of FIGS. 1-3, except that it is configured to receive an ordinary keyboard for the operator's use. According to alternate embodiments, a non-skid surface or adhesive is provided, instead of the low ridge 156, to ensure a nonmoving contact between the keyboard 152 and base 154.

Operation of the combined pointer control device 150 and keyboard 152 is substantially identical to the operation of the keyboard 100 described with reference to FIG. 1.

Figure 8:
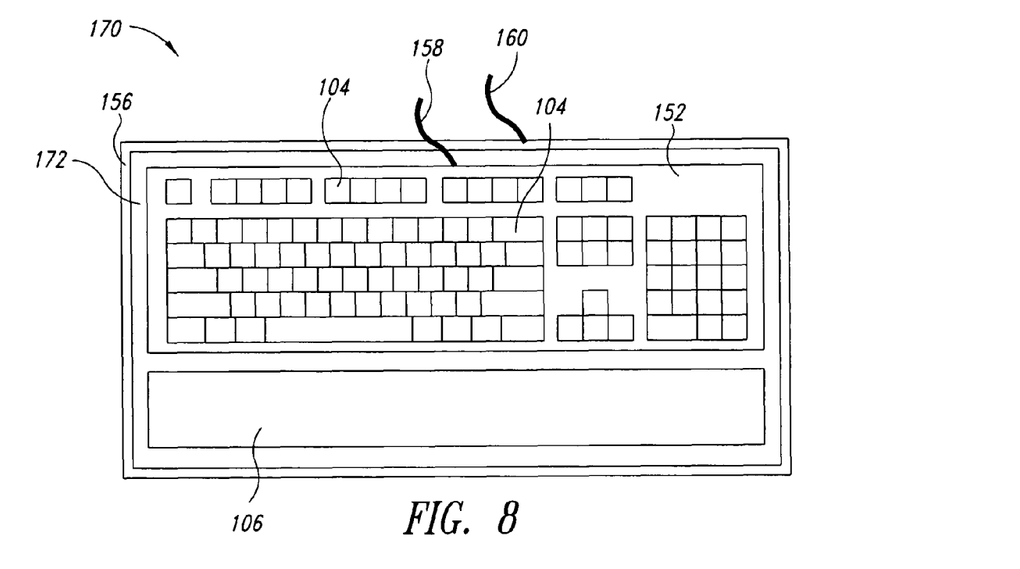

According to the embodiment of FIG. 8, a pointer control device 170 is provided, which shares many features and functions with the embodiment described with reference to FIGS. 7A and 7B. For example, a support base 172 is provided having a retaining ridge 156 and friction reduction and position tracking mechanisms 116, 118, as previously described. The pointer control device 170 may also include a wrist support pad 106 that substantially traverses the width of the support base 172. According to the embodiment of FIG. 8, mouse control buttons such as the click buttons 108, 110, and scroll wheel 112, are not provided. The device 170 is configured to receive a keyboard 152 as described with reference to FIGS. 7A and 7B, or other input device, and to be operated in a similar manner. However, the keyboard control device 170 of FIG. 8 is configured to operate in conjunction with software configured to provide the user with the ability to activate mouse key functions using the keys of a standard keyboard, such as that described with reference to FIG. 5.

Figure 9:
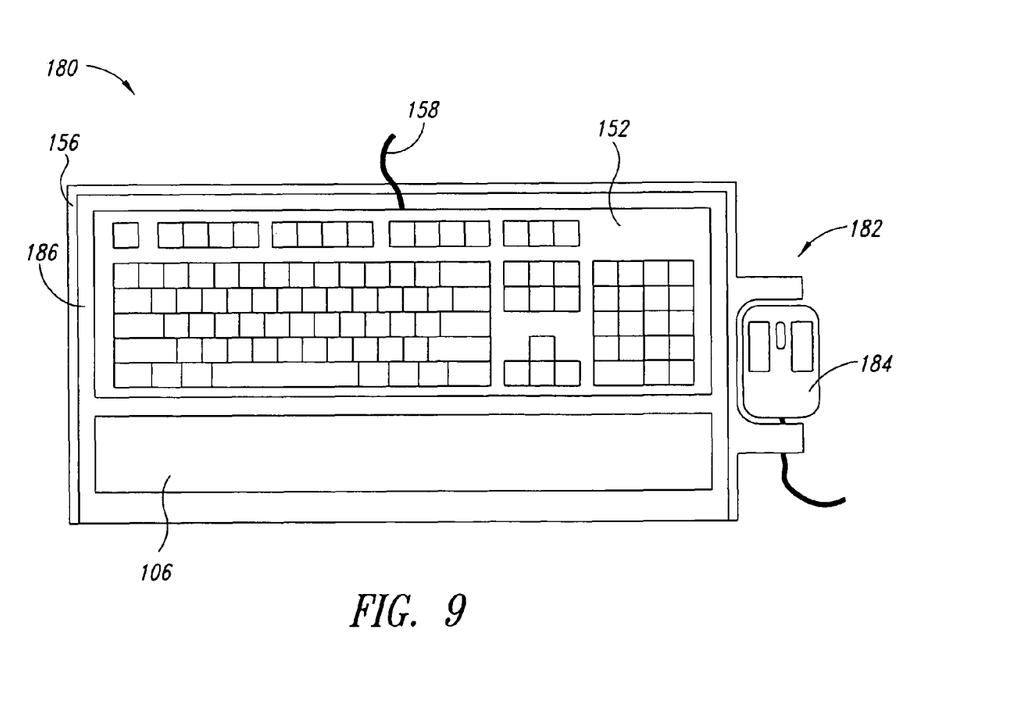

Referring now to FIG. 9, a pointer control device 180 is shown according to an additional embodiment of the invention. The mouse control device 180 is provided with a support base 186 having a wrist support pad 106, a retaining ridge 156, and configured to receive a keyboard 152, as described with reference to FIGS. 7A-8. The pointer control device 180 is also provided with friction reduction mechanisms such as those described with reference to FIGS. 1-3. However, the pointer control device 180 is not provided with a position tracking mechanism such as that described with reference to previous embodiments. Accordingly, the device 180 is passive, in the sense that there is no electronic connection between the device 180 and an associated computer. Instead, the support base 186 includes a mouse dock 182 configured to receive a standard computer mouse 184 therein.

In operation, the support base 186 receives a keyboard 152 thereon and a mouse 184 in the dock 182. An operator places his wrists on the wrist support pad 106 and is free to type on the keyboard 152 in a normal manner. At the same time, because the mouse 184 is mechanically coupled to the support base 186, movements of the pointer control device 180 over an underlying surface are detected by the mouse 184 and transmitted to the associated computer in a normal fashion. The computer associated with the pointer control device 180 may be provided with mouse emulation software such as that described with reference to previous embodiments to relieve the operator of the need to reach to press the mouse keys.

Figure 10:
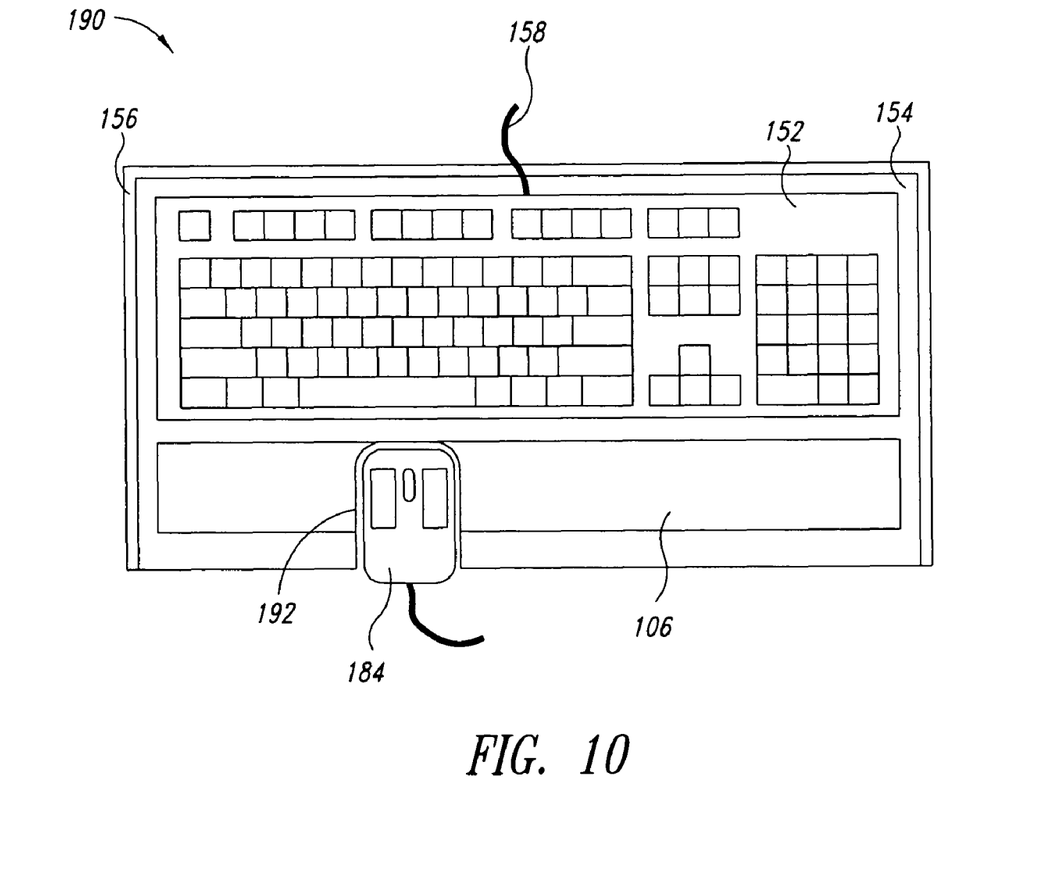

According to the embodiment of FIG. 10, the function and operation of the mouse pointer device 190 is substantially identical to that of mouse pointer device 180 of FIG. 9, with the exception that the mouse dock 192 is positioned such that the buttons of a mouse 184 docked therein are more easily accessible to an operator with his thumbs in a normal typing position.

Figure 11A:
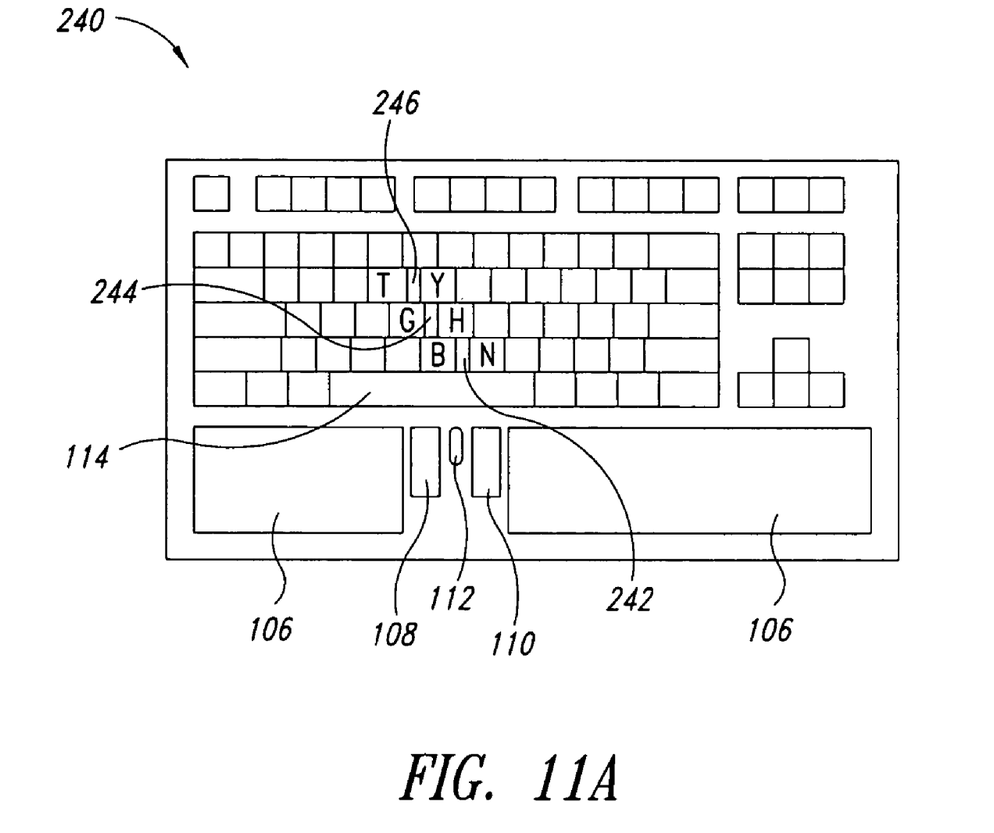
Figure 11B:
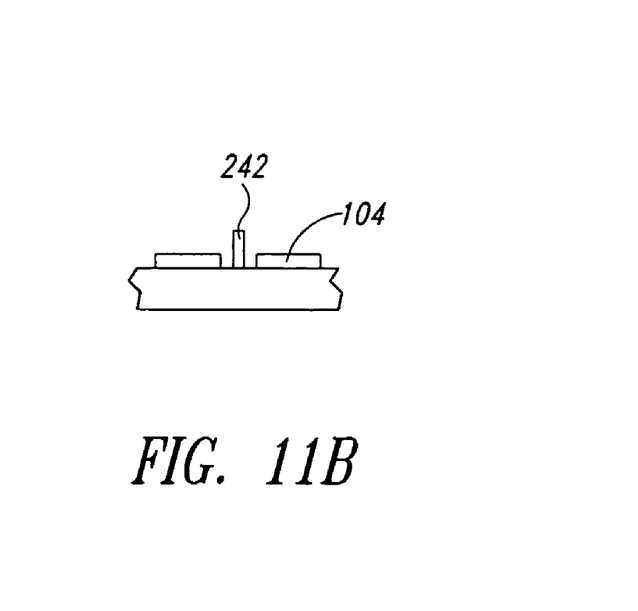

An embodiment of the invention is illustrated with reference to FIGS. 11A and 11B, in which a computer keyboard 240 is provided with an Alt or Esc key 242, a Cntrl or Del key 244, and a Back Space key 246 positioned near the center of the keyboard 240. By placing them between the groups of keys 104 normally struck by the right and left hands, these keys are easily accessible by either hand without interfering with normal typing operation. The Back Space key 246 is also typically a very heavily used key, and is thus also positioned centrally. In other respects, the keyboard 240 operates in a manner similar to other embodiments, being provided with means for tracking the position of the keyboard 240 relative to an underlying surface for pointer control. In known devices, these keys are commonly positioned near the perimeter of the keyboard. However, in applications where chording functions are heavily used, an operator is obliged to move his hands to the outer keys for these operations, which slows the operation, and requires greater effort on the part of the operator.

In the illustrated configuration, the Alt or Esc, Cntrl or Del, and Back Space keys 242, 246, 248, are narrow to minimize their impact on the spacing of the other keys 104. They are also raised above the level of the other keys 104 of the keyboard, as shown in FIG. 11B. This makes it possible for the operator to easily find the keys and to avoid striking them accidentally.

In alternate embodiments, any of the Alt or Esc, Cntrl or Del, and Back Space keys 242, 246, 248, as well as any other keys that might be advantageously repositioned, may be located in the positions described above, or in other positions that are convenient to an operator's fingers during a typing operation. For example, such keys may be positioned between the wrist support pad 106 and the space bar 114, or in the space normally occupied by mouse click buttons.

Figure 12:
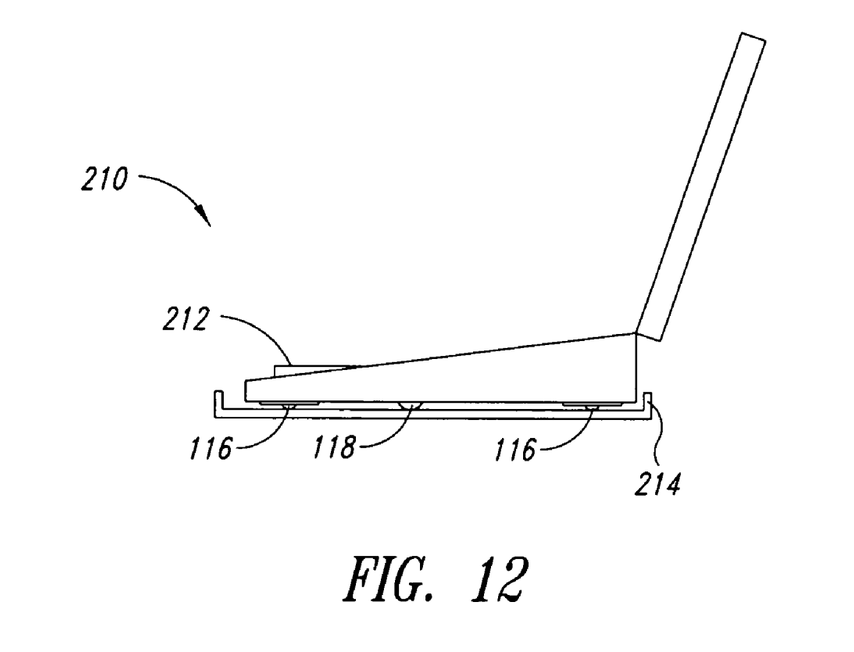

Referring to FIG. 12, a notebook computer 210 is shown in side view, according to an embodiment of the invention. The notebook computer 210 includes a wrist support surface 212 configured to receive a user's wrists, as described with reference to previous embodiments. The notebook computer 210 is provided with a plurality of friction reduction mechanisms 116 and a position tracking mechanism 118, for tracking movement of the notebook computer relative to an underlying surface, also as previously described. Accordingly, an operator may, by moving the notebook computer 210 over a smooth surface as previously described, control an onscreen pointer in a manner similar to that described with reference to previous embodiments. The notebook computer 210 may also be provided with a sliding tray 214 sized and configured to receive thereon the notebook computer, such that the device may be operated in environments where a smooth surface is not available.

It will be recognized that principles of the present invention may be employed in combination with known alternative keyboard configurations. For example, various ergonomically improved keyboard configurations are known. One such configuration has the groups of keys normally struck by the left and right hands divided and positioned at an angle relative to each other, to allow the operator's hands and wrists to rest in a more natural position. In another ergonomic configuration, the surface of the keyboard is generally curved to achieve a similar effect. In another configuration commonly known as Dvorak, the keys are arranged to maximize the use of the index and ring fingers, for improved efficiency over the more common Qwerty arrangement. Principles of the present invention may be applied with advantage to each of these configurations, as well as other such modifications.

Tests conducted by the inventor indicate that in many applications a movable keyboard provided with wrist supports and direct pointer control enables a more efficient operation of the keyboard, with less wasted motion and lower stress to the hands and wrists.

While embodiments of the invention have been described generally with reference to controlling one or more pointers on a computer monitor while manipulating a keyboard, the principles of the invention may also be practiced with reference to any on-screen manipulation, including video games in conjunction with keyboards, consoles, joysticks, and the like, remote access or control of virtual or physical devices, etc.

Figure 13:
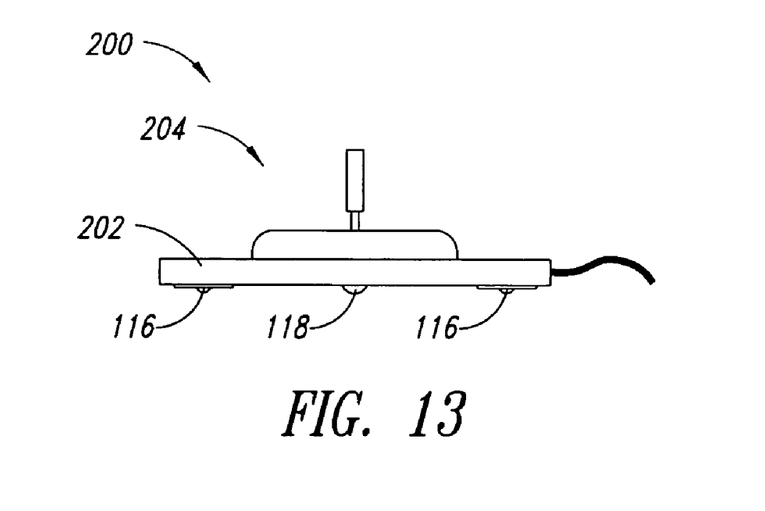

According to the embodiment of FIG. 13, a pointer control device 200 includes a housing 202 to which a joystick 204 is mounted. In operation, the pointer control device 200 provides a user with expanded capabilities, inasmuch as all the functions of a typical joystick device can be incorporated, together with the ability to track translation movement of the device 200 in two axes across an underlying surface, as described with reference to previous embodiments. Data signals from a tracking mechanism 118 may be transmitted to an associated game system. The game system may comprise a personal computer, a game console, a television, or other type of system.

While the illustrated embodiment shows a joystick, alternate embodiments may employ other types of game control input devices.

It will be recognized that, inasmuch as a typical joystick requires only one hand for operation, additional keys may be provided on the housing 202 for manipulation by the operator's free hand. Alternatively, a second pointer control device 200 may be provided for manipulation by the operator's other hand, and additional computer functions may be associated with signals from the second device 200, in a manner similar to that described with reference to FIG. 6.

According to an alternate embodiment (not pictured), a support base is provided and configured to operate with a standard joystick or other game controller to expand the available control, in a manner similar to that described with reference to FIGS. 7A and 7B.

Though described with reference to game control, the embodiment of FIG. 13, and alternate embodiments, may be used to control other types of systems, including industrial and military systems.

According to other embodiments of the invention (not pictured), principles of the invention are practiced with other electronic devices, in particular, devices configured to be hand-held. For example, in one embodiment, a personal digital assistant (PDA) is provided with low-friction contact surfaces and surface tracking means on a back side thereof. Accordingly, the device may be placed on a surface and the operator can simply slide the device across the surface in various directions to provide control over various functions such as scrolling, pointers, menus, etc. In an alternate embodiment, at least one of the low-friction contact surfaces may also be responsive to pressure such that the operator is provided with a click function simply by pressing down with slightly increased pressure on the device.

It will be recognized that these features may be advantageously employed with a variety of small hand-held electronic devices including cellular telephones; portable game players; CD, DVD, and other digital media players; and pocket computers, etc.

Additionally, or alternatively, the tracking means may be configured to be manilulable by a user's hand or finger while holding the hand-held device, such that, with one or more fingers on the back of the device, the user can control functions of the device. Such tracking means may include, for example, a roller ball, an optical tracking device, a touch pad, a movable plate, etc.

In the disclosure of many of the embodiments of the invention, one or more wrist support pads are described. Unless explicitly limited, the use of terms such as "wrist" and "hand" in the description or claims is to be interpreted inclusively, as referring to a surface configured to receive any of a user's wrist, hand, heel of the hand, side of the hand, or combinations of the same. Additionally, use of terms such as "pad," "support pad," and "wrist support surface" does not limit the feature so described to cushioned structures, but may also be used in reference to surfaces appropriately sized or contoured to function as a wrist support.

The term computer keyboard is used in the specification and claims to refer to a device that includes a housing and a plurality of computer keys. Thus, unless specifically stated otherwise, a reference to a keyboard or computer keyboard is to be understood to include a housing with keys positioned on an upper surface thereof.

As used in the specification and claims, underlying surface refers to any substantially flat surface on which a computer or tracking device can be positioned for use, and is not to be construed as being a component of such a device. In particular, while it may be used in the claims to define claimed elements or components, an underlying surface is not to be construed as itself being a component of a claimed device unless positively recited as such.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A computer pointer control device, comprising:
   a computer keyboard having a housing and a plurality of alphabetical keys;
   a wrist support coupled to the housing and configured to receive a user's wrists thereon in respective positions such that at least some of the plurality of the keys of the keyboard are under the fingers of each of the user's hands;
   a structure configured to reduce friction between a bottom surface of the housing and an underlying surface; and
   a position tracking mechanism configured to track movement of the keyboard over the underlying surface.

2. The computer pointer control device of claim 1 wherein the position tracking mechanism is coupled to the housing.

3. The computer pointer control device of claim 1 wherein the position tracking mechanism comprises:
   a roller-ball rotatably coupled to the housing;
   means for detecting rotation of the roller-ball around two axes; and
   means for transmitting a control signal to a computer to control movement of an onscreen pointer in response to detected changes of position of the keyboard relative to the underlying surface.

4. The computer pointer control device of claim 1 wherein the position tracking mechanism comprises:
   an optical tracking mechanism coupled to the housing and configured to track a change of position of the keyboard relative to the underlying surface in two axes; and
   means for transmitting a control signal to a computer to control movement of an onscreen pointer in response to detected changes of position of the keyboard relative to the underlying surface in the two axes.

5. The computer pointer control device of claim 1 further comprising a mouse-click button and scroll-wheel positioned adjacent to the wrist support such that, when the user's hand is resting on the wrist support, the mouse-click button and scroll-wheel are within reach of the thumb of the user's hand.

6. The computer pointer control device of claim 1 wherein the wrist support comprises first and second wrist supports, each configured to receive a respective one of the user's wrists resting thereon in a position such that at least some of the plurality of the keys of the keyboard are under the fingers of each of the user's hands.

7. The computer pointer control device of claim 1 wherein the position tracking mechanism comprises a mouse dock coupled to the housing and configured to removably receive a computer mouse such that movement of the device over the underlying surface is detected by the mouse.

8. The computer pointer control device of claim 1, further comprising a computer electronically coupled to the keyboard.

9. A pointer control device, comprising:
   a support base configured to removably receive a computer keyboard thereon;
   means for reducing friction between the support base and an underlying surface;
   a wrist support coupled to the support base and configured to receive a user's wrist thereon in a position such that, when a computer keyboard is properly positioned on the support base, at least some of the plurality of the keys of the keyboard are under the fingers of the user's hand; and
   tracking means for tracking movement of the support base relative to the underlying surface, and for transmitting information regarding such movement to an associated computer.

10. The device of claim 9 wherein the tracking means comprises a mouse dock configured to receive a computer pointer control device for tracking a position of the support base relative to the underlying surface.

11. The device of claim 9 wherein the tracking means comprises a tracking mechanism coupled to a bottom surface of the support base and configured to track movement of the support base relative to the underlying surface.

* * * * *